US012391207B1

(12) United States Patent
Faruque et al.

(10) Patent No.: US 12,391,207 B1
(45) Date of Patent: Aug. 19, 2025

(54) DEPLOYABLE DEVICE FOR VEHICLE DOOR

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/908,870

(22) Filed: Oct. 8, 2024

(51) Int. Cl.
*B60R 21/21* (2011.01)
*B60J 5/04* (2006.01)
*B60R 21/231* (2011.01)
*B60R 21/233* (2006.01)
*B60R 21/235* (2006.01)

(52) U.S. Cl.
CPC ............ *B60R 21/21* (2013.01); *B60J 5/0413* (2013.01); *B60J 5/0415* (2013.01); *B60R 21/23138* (2013.01); *B60R 21/233* (2013.01); *B60R 2021/23509* (2013.01)

(58) Field of Classification Search
CPC . B60R 21/21; B60R 21/23138; B60R 21/233; B60J 5/0413; B60J 5/0415
See application file for complete search history.

(56) References Cited

U.S. PATENT DOCUMENTS

| 5,544,913 | A | * | 8/1996 | Yamanishi | B60R 21/21 280/751 |
|---|---|---|---|---|---|
| 8,231,138 | B2 | | 7/2012 | Sadr et al. | |
| 8,491,008 | B2 | | 7/2013 | Roychoudhury et al. | |
| 9,180,830 | B1 | * | 11/2015 | Faruque | B60R 21/0428 |
| 11,945,395 | B1 | | 4/2024 | Farooq et al. | |
| 11,951,925 | B1 | | 4/2024 | Jaradi et al. | |
| 2003/0141709 | A1 | * | 7/2003 | Honda | B60R 21/21 280/730.2 |
| 2005/0052005 | A1 | * | 3/2005 | Lunt | B60R 21/23138 280/730.2 |
| 2007/0057491 | A1 | * | 3/2007 | Bayley | B60R 21/21 280/730.2 |
| 2008/0114516 | A1 | | 5/2008 | Jackson et al. | |
| 2008/0164681 | A1 | | 7/2008 | Nuthalapati | |

(Continued)

FOREIGN PATENT DOCUMENTS

| GB | 2392652 A | * | 3/2004 | ......... B60R 21/0428 |
|---|---|---|---|---|
| JP | 5733526 B2 | * | 6/2015 | |

*Primary Examiner* — Paul N Dickson
*Assistant Examiner* — Matthew D Lee
(74) *Attorney, Agent, or Firm* — Frank A. MacKenzie; Brooks Kushman P.C.

(57) ABSTRACT

A trim panel assembly for a vehicle door includes a trim panel having an inboard side and an outboard side. An inflatable device is supported by the trim panel. The inflatable device is inflatable from an undeployed position to a deployed position. The inflatable device includes a deployable device expandable in a direction away from the inboard side of the trim panel and in a direction away from the outboard side of the trim panel from the undeployed position to the deployed position. The deployable device is a thermoplastic elastomer. The inflatable device includes an airbag supported by the deployable device in the inflated position. The airbag is a woven fabric.

20 Claims, 8 Drawing Sheets

(56) References Cited

U.S. PATENT DOCUMENTS

| | | |
|---|---|---|
| 2009/0152849 A1 | 6/2009 | Saraf et al. |
| 2019/0256037 A1* | 8/2019 | Ghannam ............ B60R 21/0428 |
| 2024/0092301 A1* | 3/2024 | Jaradi ................... B60R 21/231 |
| 2024/0190376 A1 | 6/2024 | Ko et al. |

* cited by examiner

DEPLOYABLE DEVICE FOR VEHICLE DOOR

BACKGROUND

Vehicles are equipped with airbag assemblies that include an airbag and an inflator. In the event of a vehicle impact, the inflator activates and provides inflation medium to the airbag. This pressurizes the airbag to control the kinematics of an occupant during the vehicle impact. The airbag assemblies may be located at various positions in passenger compartment of the vehicle. Vehicles may include airbags supported on a dash, side air curtains mounted to roof rails, seat-mounted airbag, etc.

DETAILED DESCRIPTION

Figure 1:
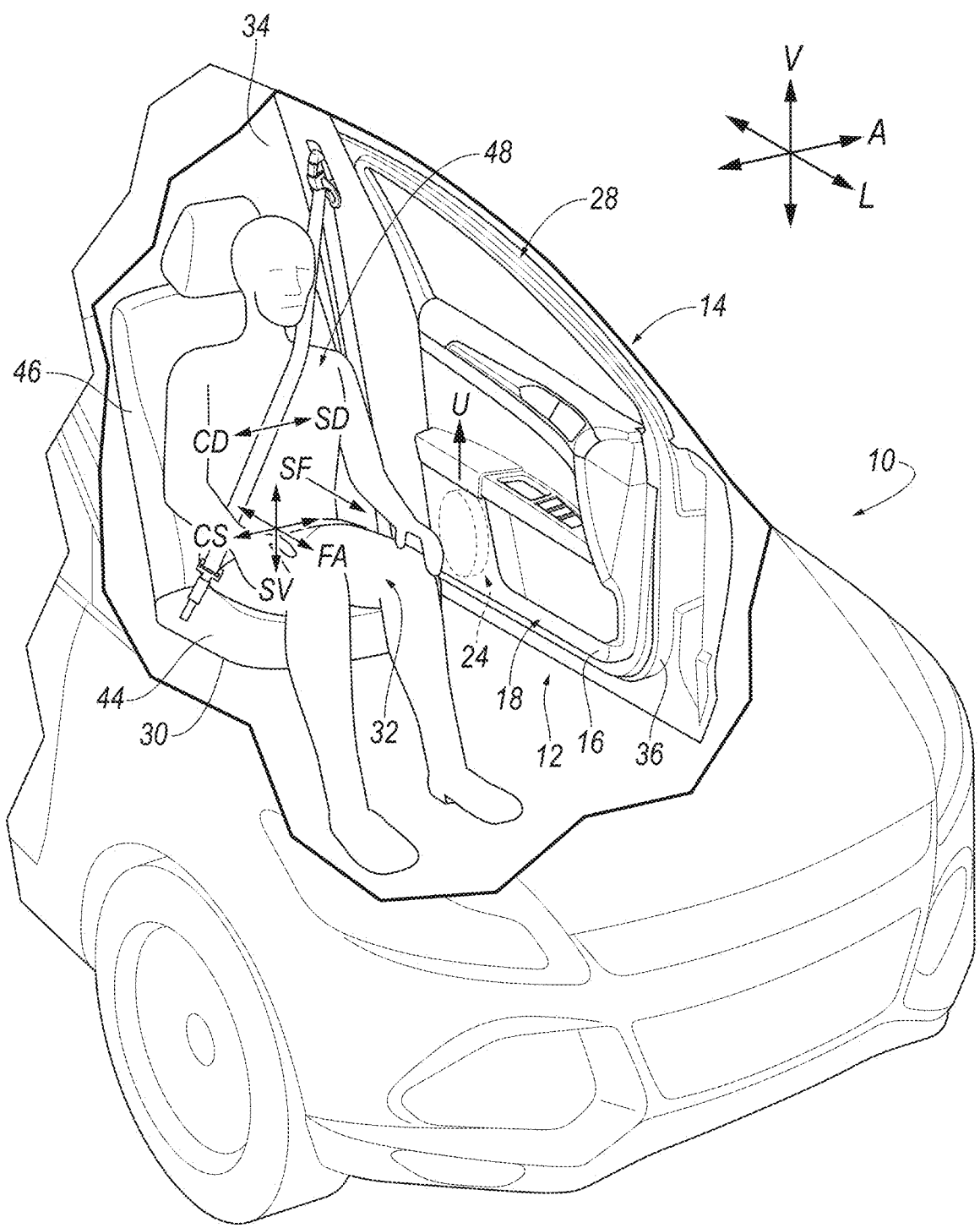
FIG. 1 is a cut-away view of a vehicle with an inflatable assembly in an uninflated position.
Figure 2:
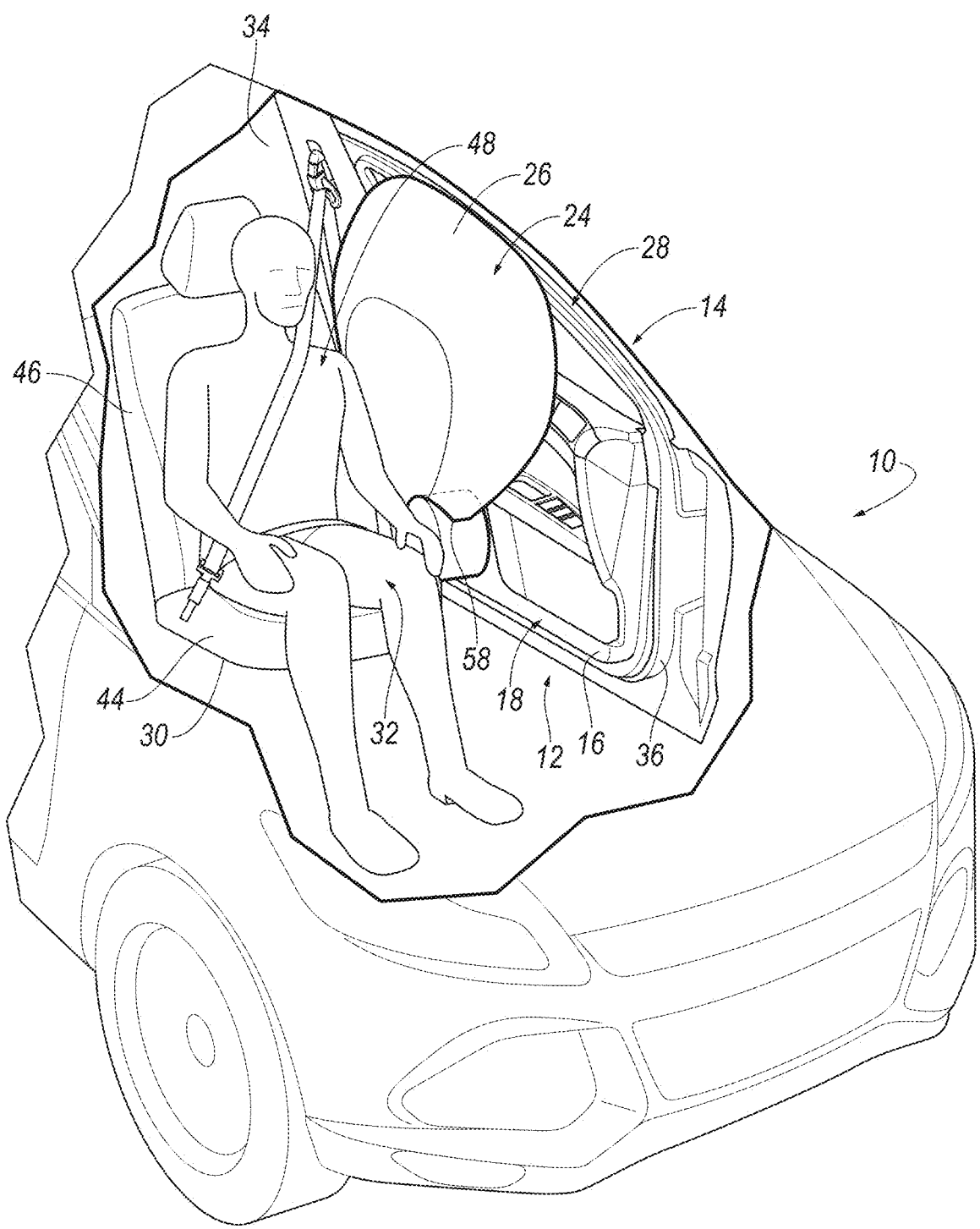
FIG. 2 is the cut-away view of the vehicle with the inflatable assembly in an inflated position.

With reference to the Figures, wherein like numerals indicate like parts throughout the several views, a trim panel assembly 12 for a vehicle door 14 includes a trim panel 16 having an inboard side 18 and an outboard side 20. An inflatable device 22 is supported by the trim panel 16. The inflatable device 22 is inflatable from an undeployed position (FIGS. 1, 5, 7) to a deployed position (FIGS. 2-4, 6, 8). The inflatable device 22 includes a deployable device 24 expandable in a direction D1 away from the inboard side 18 of the trim panel 16 and in a direction D2 away from the outboard side 20 of the trim panel 16 from the undeployed position to the deployed position. The deployable device 24 is a thermoplastic elastomer. The inflatable device 22 includes an airbag 26 supported by the deployable device 24 in the inflated position. The airbag 26 is a woven fabric.

The vehicle door 14 includes an outer door panel 28, and the trim panel 16 is supported on the outer door panel 28. The inflatable device 22 is between the outer door panel 28 and the trim panel 16. The deployable device 24 is expandable in a direction D2 away from the outer door panel 28 from the undeployed position to the deployed position.

The vehicle 10 includes a vehicle seat 30 defining a pelvis area 32 positioned inboard of the vehicle door 14. The deployable device 24 is expandable toward the pelvis area 32 from the uninflated position to the inflated position.

When the trim panel assembly 12 is mounted on the door 14 in the vehicle 10, the inflatable device 22 operates as both a pelvis pusher between the door 14 and the pelvis of an occupant of the seat 30 and a supplemental restraint between the torso of the occupant and the door 14. Specifically, the deployable device 24 in the inflated position uses the outer door panel 28 as a reaction surface and expands toward the pelvis area 32 of the seat 30 to control the kinematics of the pelvis of the occupant. Since the airbag 26 is supported by the deployable device 24, the deployable device 24 moves the airbag 26 toward the seat 30 as the deployable device 24 expand from the uninflated position to the inflated position. The deployable device 24 positions the airbag 26 for upward expansion from the uninflated position to the inflated position. In the inflated position, the airbag 26 is positioned between the torso of the occupant and the door 14 to control the kinematics of the torso of the occupant.

The vehicle 10 may be any suitable type of automobile, e.g., a passenger or commercial automobile such as a sedan, a coupe, a truck, a sport utility, a crossover, a van, a minivan, a taxi, a bus, etc. With reference to FIG. 1, the vehicle 10 defines a vehicle-longitudinal axis L extending between a front end (not numbered) and a rear-end (not numbered) of the vehicle 10. The vehicle 10 defines a vehicle-lateral axis A extending cross-vehicle from one side to the other side of the vehicle 10. The vehicle 10 defines a vertical axis V extending through a floor and roof of the vehicle 10. The vehicle-longitudinal axis L, the vehicle-lateral axis A, and the vertical axis V are perpendicular relative to each other.

The vehicle 10 includes a vehicle body. The vehicle body may be of a unibody construction in which a vehicle frame and the vehicle body are unitary (including frame rails, pillars, roof rails, etc.). As another example, the vehicle body and a vehicle frame may have a body-on-frame construction (also referred to as a cab-on-frame construction) in which the vehicle body and vehicle frame are separate components, i.e., are modular, and the body is supported on and affixed to the frame. Alternatively, the vehicle body may have any suitable construction. The vehicle body may be of any suitable material, for example, steel, aluminum, and/or fiber-reinforced plastic, etc.

The vehicle body includes body panels. The body panels may include structural panels, e.g., rockers, pillars, roof rails, etc. The body panels may include exterior panels. The exterior panels may present a class-A surface, e.g., a finished surface exposed to view by a customer and free of unaesthetic blemishes and defects. The body panels include, e.g., a roof panel, doors, fenders, hood, decklid, etc. The vehicle body may define an occupant cabin 34 to house occupants of the vehicle 10.

The doors 14 of the vehicle 10 are openable for occupants to enter and exit the occupant cabin 34. The roof may contact a top edge of the doors 14 when the doors 14 are closed. The door 14 has a vehicle-forward end and a vehicle-rearward end. The door 14 may be hinged to the rest of the vehicle body at the vehicle-forward end for rotation between an open position and a closed position. In the example shown in the Figures, the front left door includes the airbag 26 and trim panel 16 described herein. Any one, more than one, or all of the doors 14 of the vehicle 10 may include the inflatable device 22 and the trim panel 16.

Figure 3:
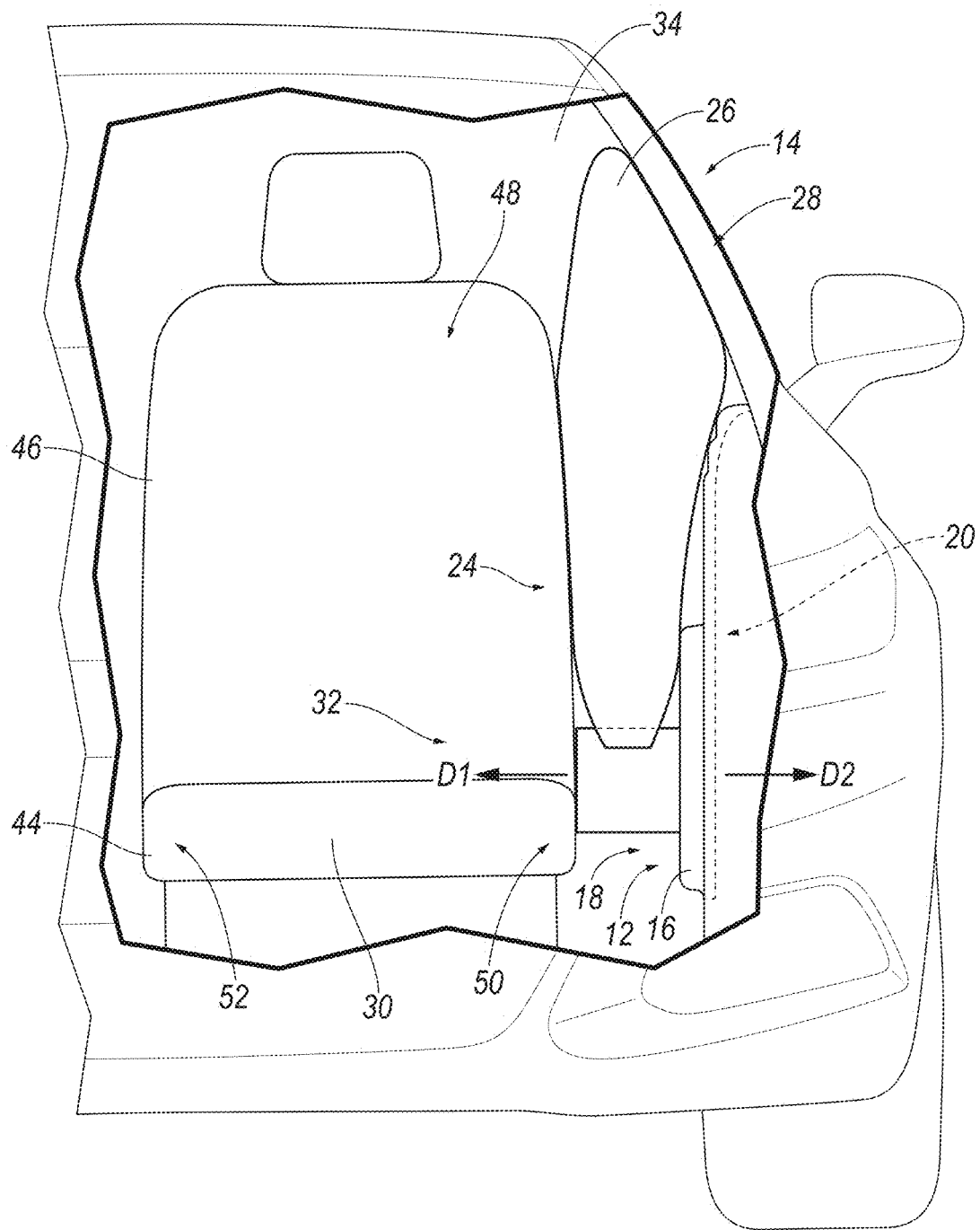
FIG. 3 is a front view of a portion of the vehicle with the inflatable assembly in the inflated position.

With reference to FIG. 3, the door 14 includes the outer door panel 28, and the trim panel 16 is supported on the outer door panel 28. Specifically, the outer door panel 28 may include two panels, namely an inner panel 36 and an outer panel 38. In such an example, the trim panel 16 and the outer panel 38 are fixed to the inner panel 36. The trim panel 16 is positioned opposite the outer panel 38 relative to the inner panel 36. The door 14 has a vehicle-exterior surface 40 and a vehicle-interior surface 42, and the trim panel 16 is disposed on the vehicle-interior surface 42. In the example shown in the Figures, outer panel 38 has the vehicle-interior surface 42 and the inner panel 36 has the vehicle-exterior surface 40. The trim panel 16 is inboard relative to the inner panel 36, and the outer panel 38 is outboard relative to the inner panel 36.

The door includes a window opening that may be completely closed by a window when the window is in a fully raised position. The window opening is defined by the trim panel 16 and outer panel 38 on a bottom edge and either by the inner panel 36 circumscribing the window opening or by the vehicle 10 body, e.g., the pillars and/or the roof. The outer panel 38 faces outboard relative to the vehicle 10. The outer door panel 28, e.g., the inner panel 36, has a vehicle-forward end and a vehicle-rearward end. The trim panel 16 has a vehicle-forward end and a vehicle-rearward end.

The outer panel 38, e.g., the vehicle-exterior surface 40 of the outer panel 38, may define a portion of the exterior of the vehicle 10. For example, the vehicle-exterior surface 40 of the outer panel 38 may present a class-A surface, i.e., a surface specifically manufactured to have a high-quality, finished aesthetic appearance free of blemishes. The outer panel 38 may be metal (such as steel, aluminum, etc.) or polymeric (such as fiber reinforced plastic composite, etc.).

The inner panel 36 may be metal (such as steel, aluminum, etc.) or polymeric (such as fiber reinforced plastic composite, etc.). The inner panel 36 may provide structural rigidity for the outer panel 38. The inner panel 36 may provide a mounting location for components of the door 14.

The trim panel 16 is supported by the outer door panel 28. In other words, the weight of the trim panel 16 is borne by the outer door panel 28. The trim panel 16 may be, for example, supported by the inner panel 36 of the outer door panel 28. The trim panel 16 is fixed to the outer door panel 28. In the example shown in the Figures, the trim panel 16 is fixed to the inner panel 36 of the door panel. The trim panel 16 may be fixed to the inner panel 36 with any suitable type of fasteners, such as Christmas-tree fasteners.

The trim panel 16 may include a core and a covering. The core may be, for example, plastic, and may be rigid relative to the covering. The covering may include upholstery, padding, etc. The upholstery may be cloth, leather, faux leather, or any other suitable material. The covering is exposed to the occupant cabin 34 and may have a class-A surface, i.e., a surface specifically manufactured to have a high quality, finished aesthetic appearance free from blemishes.

The trim panel 16 has an inboard side 18 and an outboard side 20. The outboard side 20 faces the outer door panel 28 and the inboard side 18 faces the occupant cabin 34. The outboard side 20 is vehicle-outboard of the inboard side 18, i.e., the inboard side 18 is vehicle-inboard of the outboard side 20. The inboard side 18 faces the occupant cabin 34 and is exposed to the occupant cabin 34. The inboard side 18 may include the class-A surface. For example, the covering having the class-A surface may be on the inboard side 18.

The vehicle 10 includes one or more seats 30 in the occupant cabin 34. The vehicle 10 may include any suitable number of seats 30. The seats 30 may be arranged in the occupant cabin 34 in any suitable position, i.e., as front seats, rear seats, third-row seats, etc. The seat 30 may be movable relative to the floor to various positions, e.g., movable fore-and-aft and/or cross-vehicle. The seats 30 may be of any suitable type, e.g., a bucket seat. The vehicle 10 may include any suitable number of seats 30, and any one or more of the seats 30. The vehicle 10 may include one or more trim panels 16 and inflatable device 22s with each trim panel 16/inflatable device 22 being adjacent a respective one of the seats 30.

Each seat 30 includes a seat bottom 44 and a seatback 46. The seat bottom 44 extends from the seatback 46 in a seat-forward direction SF. The seatback 46 may be supported by the seat bottom 44 and may be stationary or movable relative to the seat bottom 44. The seatback 46 and the seat bottom 44 may be adjustable in multiple degrees of freedom to vary recline angle of the seatback 46. Specifically, the seatback 46 and the seat bottom 44 may themselves be adjustable, in other words, adjustable components within the seatback 46 and/or the seat bottom 44, and/or may be adjustable relative to each other.

The seat bottom 44 and the seatback 46 each include a frame (not numbered) and a covering (not numbered) supported on the frame. The frame of the seat bottom 44 and seatback 46 may include tubes, beams, etc., and may be of any suitable material such as plastic (e.g., carbon fiber reinforced plastic (CFRP), glass fiber-reinforced semi-finished thermoplastic composite (organosheet), etc.) and/or metal (e.g., steel, aluminum, etc.).

The covering of the seat 30 may include upholstery and padding. The upholstery may be cloth, leather, faux leather, or any other suitable material. The upholstery may be stitched in panels around the frame of the seat bottom 44 and/or seatback 46. The padding may be between the covering and the frame and may be foam or any other suitable material.

The seat 30, specifically the seatback 46 and the seat bottom 44, define an occupant-seating area 48. The occupant-seating area 48 is the space occupied by an occupant properly seated on the seat 30. The occupant-seating area 48 is seat-forward of the seatback 46 and above the seat bottom 44. The occupant-seating area 48 is on a front side of the seatback 46.

The occupant-seating area 48 includes the pelvis area 32 seat forward of the seatback 46. The pelvis area 32 is configured to receive the pelvis of an occupant of the seat 30 when the occupant is properly seated in the seat 30. The pelvis area 32 is positioned inboard of the vehicle door 14. The pelvis area 32 is adjacent the trim panel 16 of the vehicle door 14.

The seatback 46 may have bolsters on opposite sides of the occupant-seating area 48. One bolster is on an inboard side of the seat 30 and one bolster is on an outboard side of the seat 30, and specifically, one bolster may be on the inboard side of the frame of the seatback 46 and the other bolster may be on the outboard side of the frame of the seatback 46. The bolsters are elongated, and specifically, are elongated in a generally upright direction when the seatback 46 is in a generally upright position. The bolsters define cross-seat boundaries of the seatback 46, i.e., the seatback 46 terminates at the bolsters. The bolsters may extend in a seat-forward direction SF relative to the occupant-seating area 48, i.e., on opposite sides of the torso and shoulders of an occupant seated on the seat 30.

The seat 30 defines the seat-forward direction SF. The seat-forward direction SF extends forward relative to the seat 30. For example, the seat-forward direction SF may extend from a rear of the seat 30 to a front of the seat 30 relative to an occupant of the seat 30, i.e., the occupant of the seat 30 faces in the seat-forward direction SF when properly seated in the seat 30. The seat bottom 44 extends from the seatback 46 in the seat-forward direction SF. The seat 30 defines a cross-seat axis CS and a seat-upright axis SU. A cross-seat direction CD extends in parallel with the cross-seat axis CS. The seat 30 includes a seat-forward axis FA, and the seat-forward direction SF is parallel to the seat-forward axis FA. The seat-forward axis FA, the cross-seat axis CS, and the seat-upright axis SU are perpendicular to each other. The seat-forward axis FA is parallel with the vehicle-longitudinal axis L when the seat 30 is forward facing and when the seat 30 is rearward facing, the cross-seat axis CS is parallel with the cross-vehicle axis A when the seat 30 is forward facing and when the seat 30 is rearward facing, and the seat-upright axis SU extends through the vehicle 10 floor and the vehicle 10 roof when the seatback 46 is in an upright position.

The seat 30 includes a first side 50 and a second side 52. The first side 50 is spaced from the second side 52 along the cross-seat axis CS. The numerical adjectives "first" and "second" are used herein as identifiers and do not indicate order or importance. In the example shown in the Figures, when the seat 30 is in a forward-facing position, the second side 52 of the seat 30 is vehicle-inboard of the first side 50 of the seat 30, and the first side 50 of the seat 30 is vehicle-outboard of the second side 52 of the seat 30.

The vehicle 10 includes a seatbelt assembly for each seat 30. The seatbelt assembly may be a three-point harness, meaning that the webbing is attached at three points around the occupant when fastened: the anchor, the seatbelt retractor, and the buckle. The seatbelt assembly may, in other examples, include another arrangement of attachment points.

The inflatable device 22 includes the deployable device 24, the airbag 26, and an inflator 54. The inflator 54 supplies inflation medium to the deployable device 24 and the airbag 26 to deploy the deployable device 24 and the airbag 26 to the inflated position. In the inflated position, the deployable device 24 controls the kinematics of the pelvis of the occupant of the seat 30 and the airbag 26 controls the kinematics of the torso of the occupant of the seat 30, as described above. The deployable device 24 has an inflation chamber in fluid communication with the inflator 54 and the airbag 26 has an inflation chamber in fluid communication with the inflator 54, as described further below. The inflation chamber of the deployable device 24 may be in fluid communication with the inflation chamber of the airbag 26, as shown in the example in the Figures.

The deployable device 24 is a thermoplastic elastomer (TPE). The TPE has both thermoplastic and elastomeric properties. Example thermoplastic elastomers include styrenic block copolymers, thermoplastic olefins, elastomeric alloys, thermoplastic polyurethanes, thermoplastic copolyesters, and thermoplastic polyamides. Walls 56 of the deployable device 24 may each have a wall 56 thickness of 1-3 mm. The walls 56 of the deployable device 24s are solid, i.e., not woven, fabric, sewn, etc. One or more walls 56 of the deployable device 24 may include folds, e.g., in an accordion shape, to allow the deployable device 24 to expand, as described below, from the uninflated position to the inflated position. The walls 56 of the deployable device 24 may maintain thickness, i.e., do not appreciably stretch and thin, as the deployable device 24 expands from the uninflated position to the inflated position.

The deployable device 24 may be formed using any suitable manufacturing process, e.g., injection molding, blow molding, etc. The walls 56 of the deployable device 24 may be unitary. Unitary means a single, uniform piece of material with no seams, joint 58s, fasteners, or adhesives holding the walls 56 together, i.e., the walls 56 are formed together simultaneously as a single continuous unit. Non-unitary components, in contrast, are formed separately and subsequently assembled, e.g., by welding, bonding, adhesive, etc.

The airbag 26 is inflatable from the deployable device 24 from the uninflated position to the inflated position. The airbag 26 may be woven fabric, e.g., a woven polymer. As an example, the airbag 26 may be woven nylon yarn, for example, nylon 6, 6. Other examples of woven polymers include polyether ether ketone PEEK, polyetherketoneketone PEKK, polyester, etc. The woven polymer may include a coating, such as silicone, neoprene, urethane, etc. For example, the coating may be polyorgano siloxane. One or more woven fabric panels of the airbag 26 may enclose the inflation chamber of the airbag 26.

The airbag 26 is directly connected to the deployable device 24. As an example, the airbag 26 is directly connected to the wall 56 of the deployable device 24 with the inflation chamber of the airbag 26 open to the inflation chamber of the deployable device 24 (as shown with arrows in 6 and 8). As one example, the deployable device 24 may be over-molded on the airbag 26 at a joint 58 between the deployable device 24 and the airbag 26. "Over-molded" is used herein as a structural description of the joint 58, not the process by which the joint 58 is made. In other words, the over-molded joint 58 has the structure of an over-molded component unitarily connecting the airbag 26 to the deployable device 24. When over-molded, the joint 58 joins the airbag 26 to the deployable device 24 without fasteners or adhesives holding the airbag 26 and the deployable device 24 together. In such an example, the joint 58 has a shape that conforms to a mold, e.g., an injection mold, used to form the deployable device 24 to form the joint 58 as an over-molded component to airbag 26. In such an example, the joint 58 is unitary with the deployable device 24. In other examples, the airbag 26 may be connected to the deployable device 24 by adhesive, bonding, welding, etc.

Figure 4:
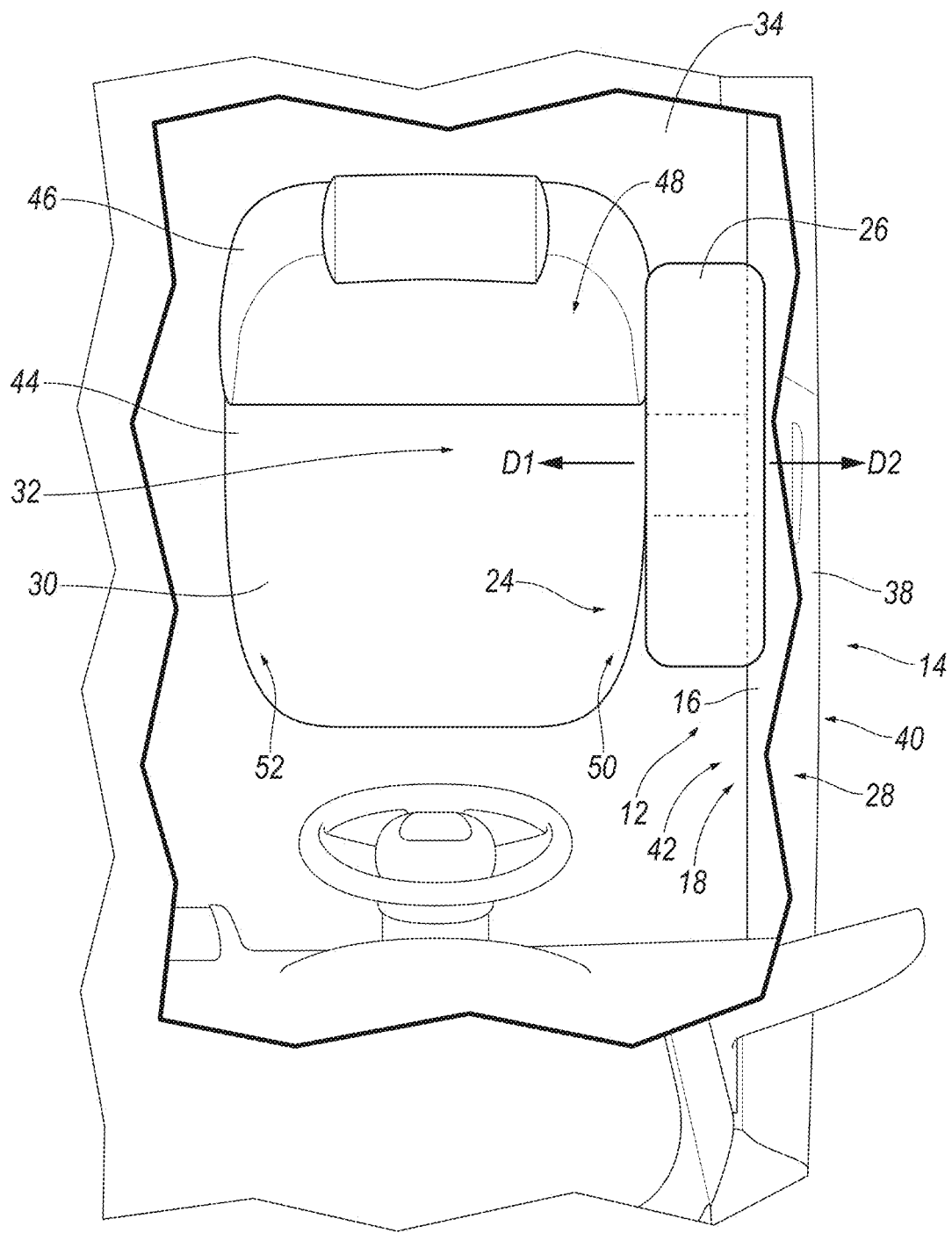
FIG. 4 is a front view of a portion of the vehicle with the inflatable assembly in the inflated position.
Figure 5:
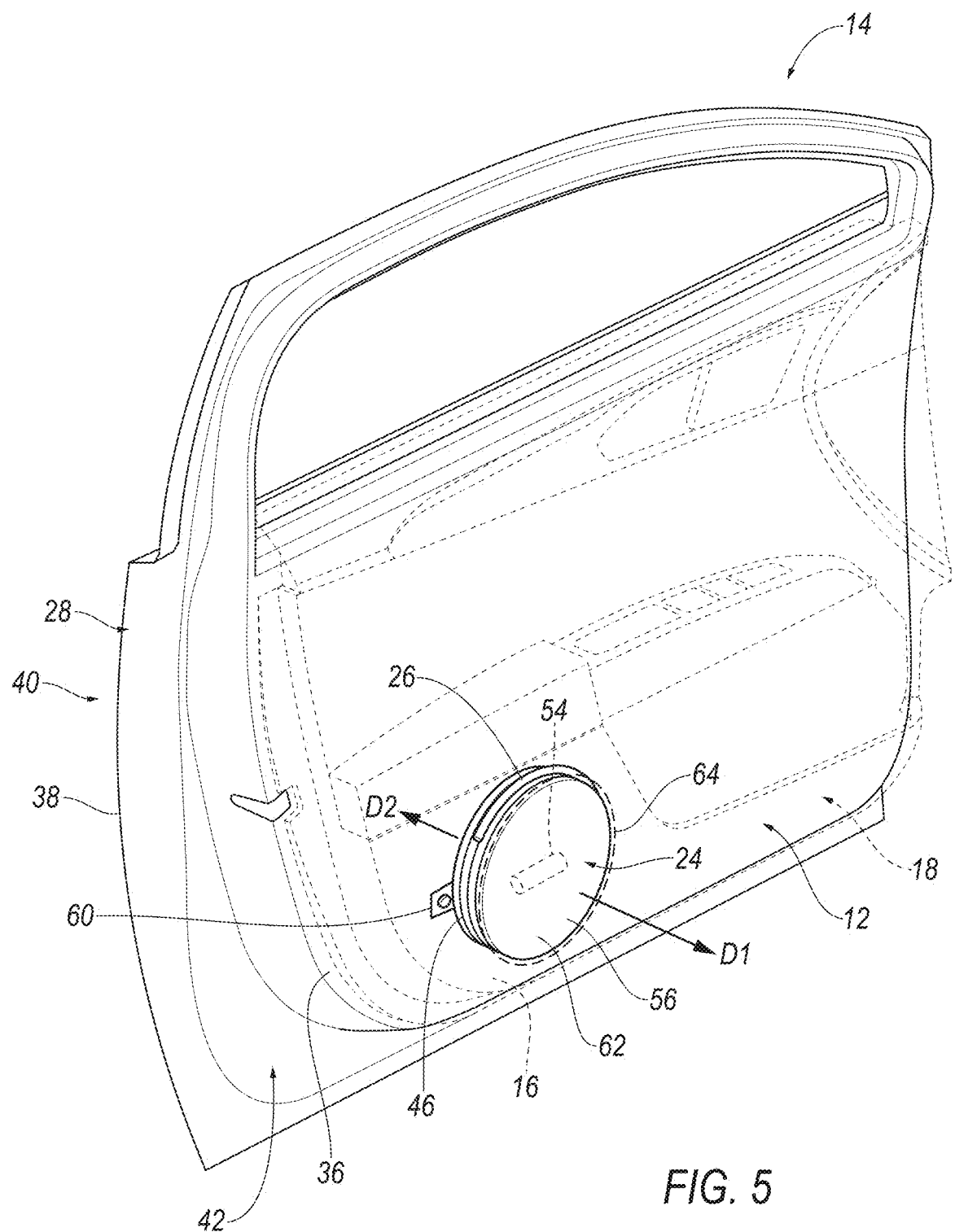
FIG. 5 is a perspective view of a door of the vehicle with one example of the inflatable assembly in the uninflated position.
Figure 6:
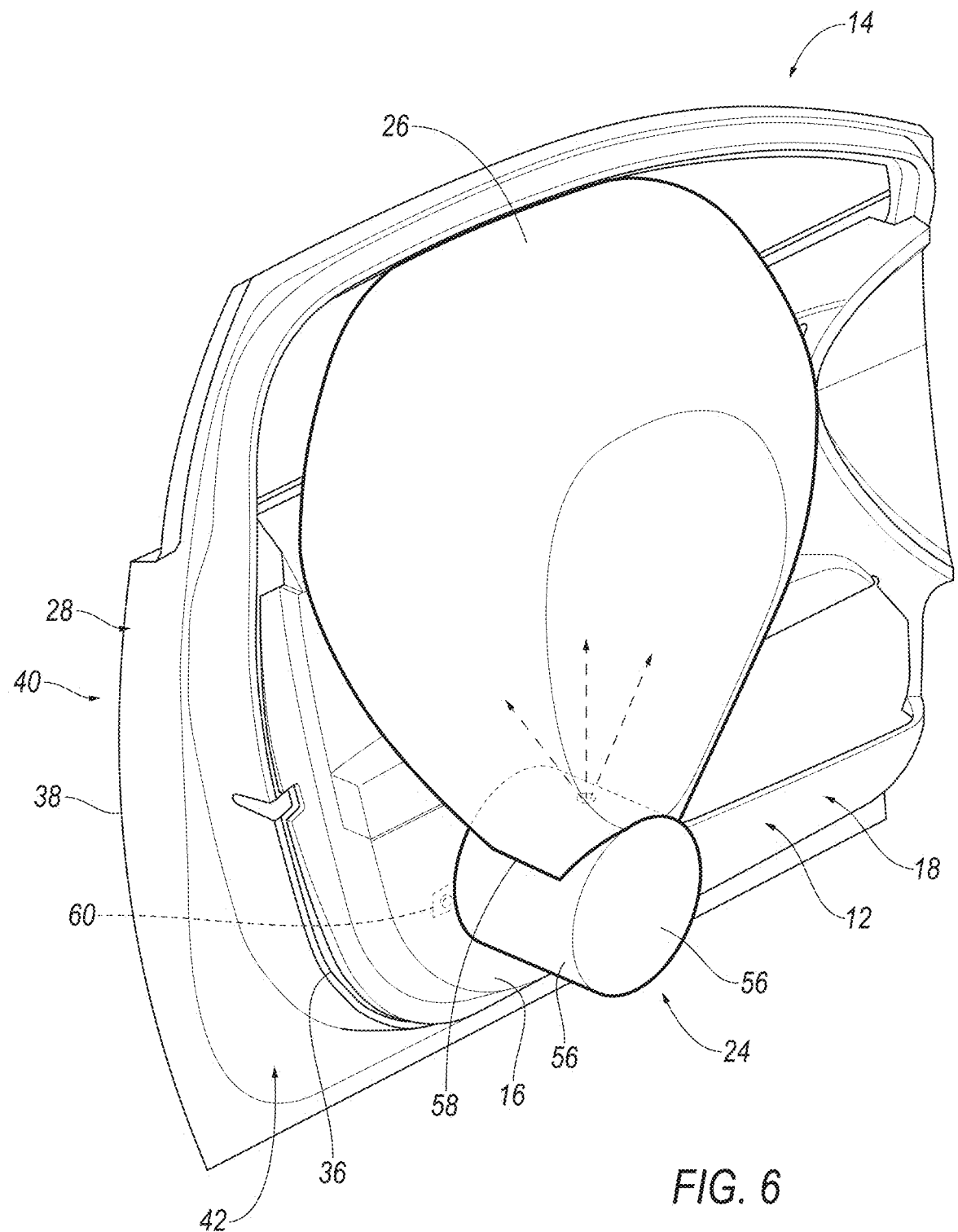
FIG. 6 is the perspective view of FIG. 5 with the inflatable assembly in the inflated position.

In some examples, the inflatable device 22 may be supported directly by the outer door panel 28 of the door 14, e.g., the outer panel 38 of the outer door panel 28. In such an example, the deployable device 24 may be directly connected to the outer door panel 28 and supported by the outer door panel 28. In such an example, the deployable device 24 may be fastened to the outer panel 38. As an example, the deployable device 24 may include fastening features 60 unitary with the walls 56 of the deployable device 24. As an example, the fastening features 60 may be fasteners, e.g., Christmas-tree fasteners, clips, etc., that are unitary with the walls 56 and/or that receive fasteners, such as holes (as shown in FIGS. 3-4), clips, etc., that receive a fastener such as a threaded fastener, Christmas tree fastener, clip, etc. In examples in which the deployable device 24 is directly connected to the outer panel 38 of the door, the deployable device 24 may abut the outer panel 38 of the door in the inflated position and in the uninflated position. In such examples, the inflatable device 22 uses the outer panel 38 of the door as a reaction surface and expands away from the outer panel 38 into the occupant cabin 34 from the uninflated position to the inflated position.

Figure 7:
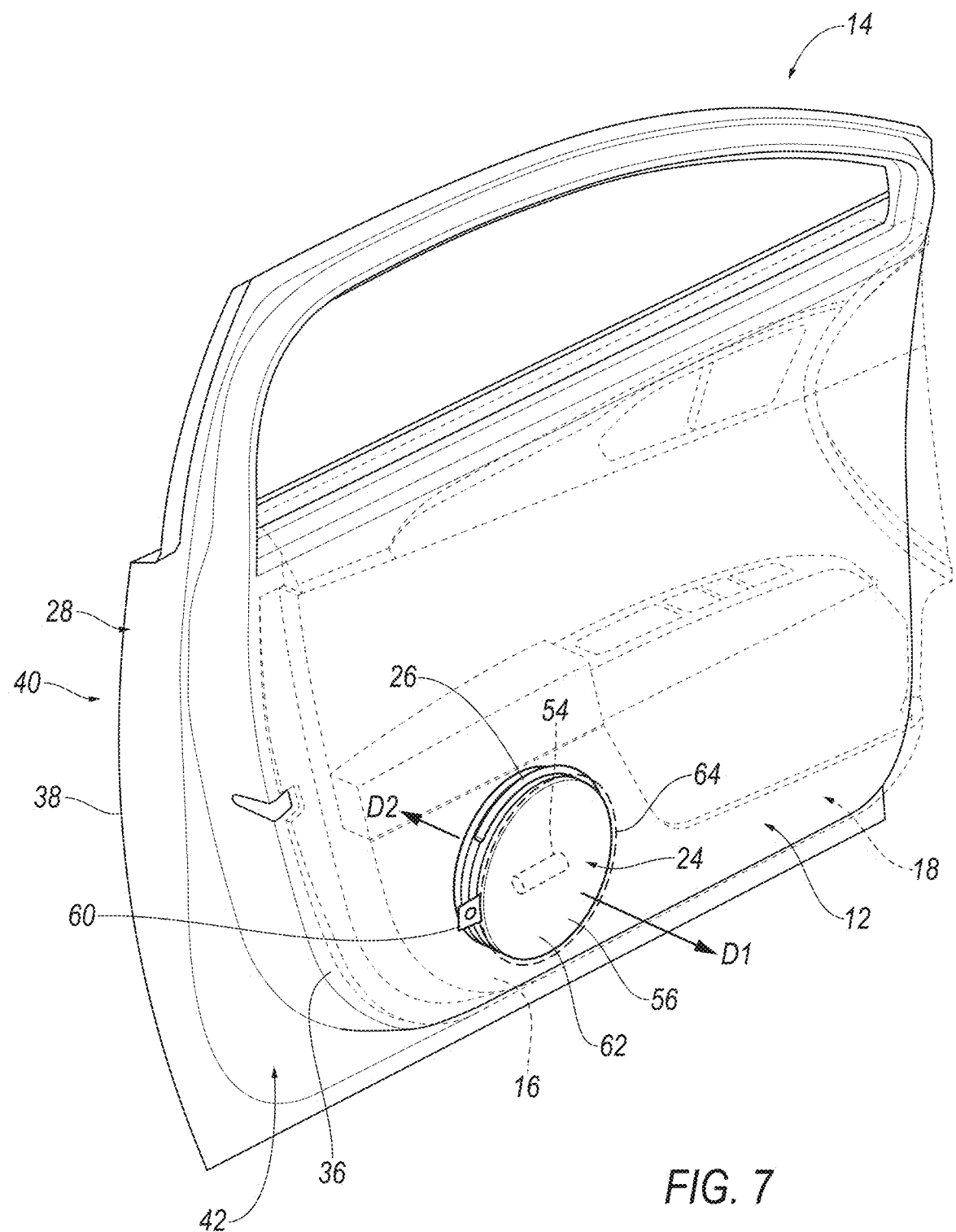
FIG. 7 is a perspective view of a door of the vehicle with another example of the inflatable assembly in the uninflated position.
Figure 8:
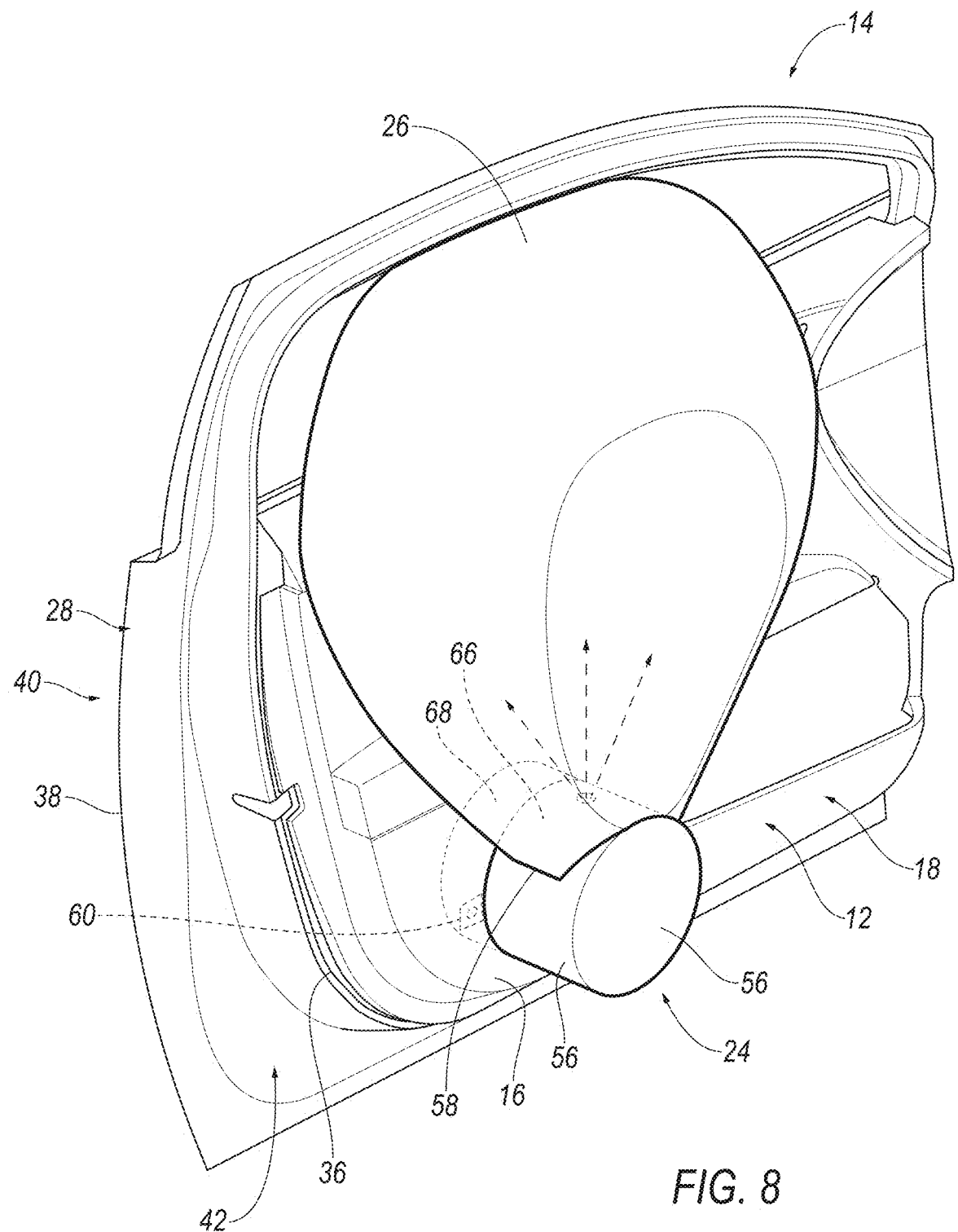
FIG. 8 is the perspective view of FIG. 7 with the inflatable assembly in the inflated position.

In some examples, the inflatable device 22 may be supported by the trim panel 16, i.e., the weight of the inflatable device 22 may be borne by the trim panel 16, in the uninflated position and in the inflated position, as shown in the example in FIGS. 7-8. As one example, the deployable device 24 may be directly connected to the trim panel 16 and supported by the trim panel 16. In such an example, the deployable device 24 may be fastened to the trim panel 16, as shown in the example in FIGS. 7-8. As an example, the deployable device 24 may include fastening features 60 unitary with the walls 56 of the deployable device 24. As an example, the fastening features 60 may be fasteners, e.g., Christmas-tree fasteners, clips, etc., that are unitary with the walls 56 and/or may include features that receive fasteners, such as holes (as shown in FIGS. 7-8), clips, etc., that receive a fastener such as a threaded fastener, Christmas tree fastener, clip, etc.

In examples in which the inflatable device 22 is supported by the trim panel 16, the deployable device 24 may be spaced from the outer panel 38 of the door in the uninflated position and may abut the outer panel 38 of the door in the inflated position. In such examples, the deployable device 24 expands to the outer panel 38 of the door and expands away from the outer panel 38 into the occupant cabin 34, as shown in FIGS. 7-8. In other words, the deployable device 24 is expandable in a direction D1 away from the inboard side 18 of the trim panel 16 and in a direction D2 away from the outboard side 20 of the trim panel 16 from the undeployed position to the deployed position. In such examples, the deployable device 24 uses the outer panel 38 as a reaction surface. In other examples in which the inflatable device 22 is supported by the trim panel 16, the deployable device 24 may abut the outer panel 38 of the door 14 in both the uninflated position and the inflated position, and in such examples, the inflatable device 22 expands into the occupant cabin 34 from the uninflated position to the inflated position.

The deployable device 24 may include an exposed surface 62 exposed to the occupant cabin 34. In such an example, the exposed surface 62 may be flush with the inboard side 18 of the trim panel 16. In other words, the exposed surface 62 is immediately adjacent to the inboard side 18 of the trim panel 16 and follows the contours of the inboard side 18 of the trim panel 16 around the entire circumference of the exposed surface 62 of the deployable device 24. In examples in which the deployable device 24 includes the exposed surface 62 exposed to the occupant cabin 34, the exposed surface 62 may be a class-A surface, i.e., a surface specifically manufactured to have a high-quality, finished aesthetic appearance free of blemishes. The TPE of the deployable device 24 may be manufactured with the exposed surface 62 being a class-A surface, e.g., the TPE may be textured in the molding process to match the contours and texture of the adjacent inboard surface of the trim panel 16. In such examples, the deployable device 24 may be integrated with the trim panel 16, either by unitary formation or subsequent assembly, without an additional covering over the deployable device 24.

The inflatable device 22, including the deployable device 24, the airbag 26, and the inflator 54, may be assembled to the vehicle door 14 (e.g., the trim panel 16 or the door panel) as a unit. As one example, the trim panel 16 may have a hole 64 and the deployable device 24 may be mounted to the trim panel 16 with the exposed surface 62 filling the hole 64. As another example, the trim panel 16, or a portion of the trim panel 16, may be over-molded to the deployable device 24. When the inflatable device 22 is assembled to the trim panel 16 and the trim panel 16 is assembled to the outer panel 38 of the door, the inflatable device 22 is between the trim panel 16 and the outer panel 38. In other words, at least a portion of the inflatable device 22 is in a space between the trim panel 16 and the outer panel 38 in the uninflated position.

The airbag 26 is supported by the deployable device 24 in the uninflated position and in the inflated position. In the uninflated position, the airbag 26 may be rolled or folded on deployable device 24 in the uninflated position. The airbag 26 moves with the deployable device 24 as the deployable device 24 expands away from the outer panel 38 of the door into the occupant cabin 34. Specifically, the joint 58 between the airbag 26 and the deployable device 24 moves vehicle-inboard away from the outer panel 38 of the door 14 into the occupant cabin 34 as the deployable device 24 expands. The airbag 26 expands upwardly from the deployable device 24 into the occupant cabin 34, specifically, between the door 14 and the occupant to control the kinematics of the occupant. In some examples, the airbag 26 is elongated in an upward direction U from the deployable device 24 in the inflated position. In other words, the longest dimension of the airbag 26 is in the upward direction U from the deployable device 24. The upward direction U may be vertical. The properties of the TPE that aid in expansion characteristics and the shape, size, and dimensions of the inflatable device 22s in the inflated position allow for specific deployment of the deployable device 24 into the occupant cabin 34 to position the airbag 26 for upward inflation.

In some examples, the deployable device 24 may include more than one chamber. In the example shown in FIGS. 7-8, the deployable device 24 includes a first chamber 66 a second chamber 68, and an interior panel 70 between the first chamber 66 and the second chamber 68. The first chamber 66 and the second chamber 68 are components of the inflation chamber of the deployable device 24, and the interior panel 70 divides the inflation chamber of the deployable device 24 into the first chamber 66 and the second chamber 68. In such examples, the first chamber 66 that expands away from the outer door panel 28 into the occupant cabin 34 from the undeployed position to the deployed position. In such an example, the first chamber 66 expands in a direction D1 away from the inboard side 18 of the trim panel 16. The second chamber 68 expands to the outer door panel 28 from the undeployed position to the deployed position, i.e., at least one wall 56 defining the second chamber 68 abuts the outer panel 38 in the deployed position. In such an example, the second chamber 68 expands in a direction D2 away from the outboard side 20 of the trim panel 16. In such examples, the airbag 26 is supported by the first chamber 66 and moves with the first chamber 66 into the occupant cabin 34 as the inflatable device 22 expands from the uninflated position to the inflated position.

In some examples, the interior panel 70 may fluidly separate the first chamber 66 from the second chamber 68. In such examples, the inflator 54 may be directly connected to both the first chamber 66 and the second chamber 68, e.g., through fill tubes, diffuser tubes, etc. In some examples, the interior panel 70 may include vents, baffles, diffusers, etc., that allow selective or diffused flow of inflation medium between the first chamber 66 and the second chamber 68.

The inflator 54 is in fluid communication with the deployable device 24 and the airbag 26. In other words, inflation medium from the inflator 54 flows into the inflation chambers of the deployable device 24 and the airbag 26 to expand the inflatable device 22 to the inflated position. The inflator 54 expands the deployable device 24 and the airbag 26 with inflation medium, such as a gas, to move the inflatable device 22 from the uninflated position to the inflated position. The inflator 54 may be, for example, a pyrotechnic inflator that ignites a chemical reaction to generate the inflation medium, a stored gas inflator 54 that releases (e.g., by a pyrotechnic valve) stored gas as the inflation medium, or a hybrid. The inflator 54 may be, for example, at least partially in the inflation chamber of the deployable device 24 to deliver inflation medium directly to the inflation chamber of the deployable device 24 or may be connected to the inflation chamber of the deployable device 24 through fill tubes, diffusers, etc.

The inflator 54 may be supported by any suitable component of the door 14. As one example, the inflator 54 may be connected with and moveable as a unit with the deployable device 24. As an example, the inflator 54 may be in the inflation chamber of the deployable device 24. In such examples, the deployable device 24 may have mounting components, e.g., clips, fasteners, etc., that attach the inflator 54 to the deployable device 24. In such examples, the mounting components may be unitary with a wall 56 of the deployable device 24. In examples in which the inflator 54 is in the inflation chamber of the inflatable device 22, the deployable device 24, airbag 26, and inflator 54 are assembled to the outer panel 38 of the door or the trim panel 16 as a unit. In other example, the inflator 54 may be mounted to the outer panel 38 of the door or to the trim panel 16, and in such examples, the inflator 54 is in fluid communication with the deployable device 24 through a fill tube.

In the example shown in the Figures, the inflatable device 22 defines a fluid path through the deployable device 24 from the inflator 54 to the airbag 26. In other words, the inflator 54 supplies inflation medium directly to the inflation chamber of the deployable device 24 and the inflation medium flows through the inflation chamber of the deployable device 24 into the airbag 26. As set forth above, in some examples, including the example in FIGS. 7-8, the deployable device 24 includes the first chamber 66 and the second chamber 68. In such an example, the deployable device 24 defines a fluid path through the first chamber 66 from the inflator 54 to the airbag 26. In other words, inflation medium flows from the inflator 54 into the first chamber 66 and from the first chamber 66 into the airbag 26. As set forth above, in some examples, the inflator 54 may provide inflation medium directly the first chamber 66 or may provide inflation medium to the first chamber 66 through the second chamber 68.

The vehicle 10 includes a computer that controls the activation of the inflator 54. The computer may be, for example, a restraints control module. The computer includes a processor and a memory. The memory includes one or more forms of computer readable media, and stores instructions executable by the processor for performing various operations, including as disclosed herein. For example, the computer can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer. The memory can be of any type, e.g., hard disk drives, solid state drives, servers, or any volatile or non-volatile media. The memory can store the collected data sent from the sensors. The memory can be a separate device from the rest of the computer, and the computer can retrieve information stored by the memory via a network in the vehicle 10, e.g., over a CAN bus, a wireless network, etc.

The vehicle 10 may include at least one impact sensor for sensing certain vehicle 10 impacts (e.g., impacts of a certain magnitude, direction, etc.), and the computer is in communication with the impact sensor and the inflator 54. The computer may activate the inflator 54, e.g., provide an impulse to a pyrotechnic charge of the inflator 54 when the impact sensor senses certain vehicle 10 impacts. The impact sensor may be configured to sense certain vehicle 10 impacts prior to impact, i.e., pre-impact sensing. The impact sensor may be in communication with the computer. The impact sensor is configured to detect certain vehicle 10 impacts. In other words, a "certain vehicle 10 impact" is an impact of the type and/or magnitude for which inflation of the airbag 26 is designed i.e., "certain" indicates the type and/or magnitude of the impact. The type and/or magnitude of such "certain vehicle 10 impacts" may be pre-stored in the computer, e.g., a restraints control module. The impact sensor may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle door comprising:
   an outer door panel;
   a trim panel supported on the outer door panel; and
   an inflatable device between the outer door panel and the trim panel, the inflatable device being inflatable from an undeployed position to a deployed position;
   the inflatable device including a deployable device expandable in a direction away from the outer door panel from the undeployed position to the deployed position, the deployable device being a thermoplastic elastomer; and
   the inflatable device including an airbag supported by the deployable device in an inflated position, the airbag being a woven fabric.

2. The vehicle door as set forth in claim 1, wherein the deployable device expands to the outer door panel from the undeployed position to the deployed position.

3. The vehicle door as set forth in claim 1, wherein the airbag is elongated in an upward direction from the deployable device in the inflated position.

4. The vehicle door as set forth in claim 1, wherein:
   the deployable device includes a first chamber that expands away from the outer door panel from the undeployed position to the deployed position; and
   the deployable device includes a second chamber that expands to the outer door panel from the undeployed position to the deployed position.

5. The vehicle door as set forth in claim 4, wherein the airbag is supported by the second chamber.

6. The vehicle door as set forth in claim 5, further comprising an inflator, the inflatable device defining a fluid path through the first chamber from the inflator to the airbag.

7. The vehicle door as set forth in claim 1, further comprising an inflator, the inflatable device defining a fluid path through the deployable device from the inflator to the airbag.

8. The vehicle door as set forth in claim 1, wherein the deployable device is supported by the trim panel in an uninflated position and in the inflated position.

9. A vehicle comprising:
a vehicle door;
a vehicle seat defining a pelvis area positioned inboard of the vehicle door;
the vehicle door including an outer door panel and a trim panel supported on the outer door panel; and
an inflatable device between the outer door panel and the trim panel, the inflatable device being inflatable from an undeployed position to a deployed position;
the inflatable device including a deployable device supported by the trim panel in an uninflated position and an inflated position, the deployable device being expandable toward the pelvis area from the uninflated position to the inflated position, the deployable device being a thermoplastic elastomer; and
the inflatable device including an airbag supported by the deployable device in the inflated position, the airbag being a woven fabric.

10. The vehicle as set forth in claim 9, wherein the deployable device expands to the pelvic area of the seat from the undeployed position to the deployed position.

11. The vehicle door as set forth in claim 9, wherein the deployable device is spaced from the outer door panel in the uninflated position and expands to the outer door panel from the undeployed position to the deployed position.

12. The vehicle door as set forth in claim 9, wherein the airbag is elongated in an upward direction from the deployable device in the inflated position.

13. The vehicle door as set forth in claim 9, further comprising an inflator, the inflatable device defining a fluid path through the deployable device from the inflator to the airbag.

14. The vehicle door as set forth in claim 9, wherein the deployable device is supported by the trim panel in the uninflated position and the inflated position.

15. A vehicle door trim panel assembly comprising:
a trim panel having an inboard side and an outboard side; and
an inflatable device supported by the trim panel, the inflatable device being inflatable from an undeployed position to a deployed position;
the inflatable device including a deployable device expandable in a direction away from the inboard side of the trim panel and in a direction away from the outboard side of the trim panel from the undeployed position to the deployed position, the deployable device being a thermoplastic elastomer; and
the inflatable device including an airbag supported by the deployable device in an inflated position, the airbag being a woven fabric.

16. The vehicle door trim panel assembly as set forth in claim 15, wherein the inboard side includes a class-A surface.

17. The vehicle door trim panel assembly as set forth in claim 16, wherein the deployable device includes a class-A surface flush with the class-A surface of the inboard side of the trim panel.

18. The vehicle door as set forth in claim 15, wherein:
the deployable device includes a first chamber expandable in the direction away from the inboard side of the trim panel from the undeployed position to the deployed position; and
the deployable device includes a second chamber expandable in the direction away from the outboard side of the trim panel from the undeployed position to the deployed position.

19. The vehicle door as set forth in claim 18, wherein the airbag is supported by the second chamber.

20. The vehicle door as set forth in claim 15, further comprising an inflator, the inflatable device defining a fluid path through the deployable device from the inflator to the airbag.

* * * * *